April 6, 1965     E. E. MILLER ETAL     3,176,930

FEATHERING DEVICE FOR CLOSED FACE SPINNING REEL

Filed Oct. 29, 1962

INVENTOR.
EARL E. MILLER
ADOLPH C. REHM

BY Woodhams, Blanchard and Flynn

ATTORNEYS

United States Patent Office 3,176,930
Patented Apr. 6, 1965

3,176,930
FEATHERING DEVICE FOR CLOSED FACE SPINNING REEL
Earl E. Miller and Adolph C. Rehm, Dowagiac, Mich., assignors to James Heddon's Sons, Dowagiac, Mich., a corporation of Michigan
Filed Oct. 29, 1962, Ser. No. 233,753
1 Claim. (Cl. 242—84.2)

This application relates to fishing reels and particularly to line braking means arranged for use with a reel of the axial discharge type.

In the casting of a fishing bait, it has long been a common and well-known practice regardless of the type of reel being utilized to apply a slight drag to the line, sometimes termed "feathering," as the bait approaches the end of the cast in order to restrict the line from running off of the reel too rapidly and creating a snarl. In the type of reel where the line runs substantially perpendicular to the axis of the reel, this feathering operation has commonly been carried out by the operator applying his thumb lightly to the portion of the reel on which the line is wound. The direct contact between the operator's thumb and the line being unwound from the reel gives the operator an extremely accurate sensing of the pressure being applied to the line and accordingly the ability to apply the feathering drag with the delicacy necessary to restrict excessive outrunning of the line without appreciably, if at all, restricting the travel of the bait. However, this procedure is impracticable for the type of reel where the line enters and leaves the reel in an axial direction.

Since the advent of axial-type reels into common use, many attempts have been made to apply an accurately controllable feathering drag to such a reel and some of these devices have been moderately successful. However, in a continuing effort to improve this type of product, and to provide a feathering drag thereon having a maximum of structural simplicity and therefore a minimum of both original cost and maintenance problems, we have devised the subject matter of the present invention.

Accordingly, the objects of the invention include:

(1) To provide a feathering drag for an axial delivery-type fishing reel capable of being controlled with an accuracy at least substantially equivalent to the control exercisable when an operator places his thumb directly upon the line-covered portion of a radial discharge type of fishing reel.

(2) To provide a feathering drag, as aforesaid, which can be applied to a presently standard make of axial discharge fishing reel with a minimum of change in the parts thereof.

(3) To provide a feathering drag, as aforesaid, which will require the use of a minimum number of parts and which can accordingly be provided with a minimum of additional expense, both in manufacturing costs and in maintenance costs.

(4) To provide a feathering drag, as aforesaid, which will be reliable in operation and whose operation will have a high degree of uniformity from one time of use to another.

(5) To provide a feathering drag, as aforesaid, which will not interfere with the normal functioning of the main brake or drag mechanism.

(6) To provide a feathering drag, as aforesaid, which will operate from the same control as the main drag mechanism and will do so automatically and without special triggering or other control or initiating apparatus.

Other objects and purposes of the invention will be apparent to persons acquainted with devices of this general type upon reading the following specification and upon inspection of the accompanying drawings.

*General description*

Figure 1:
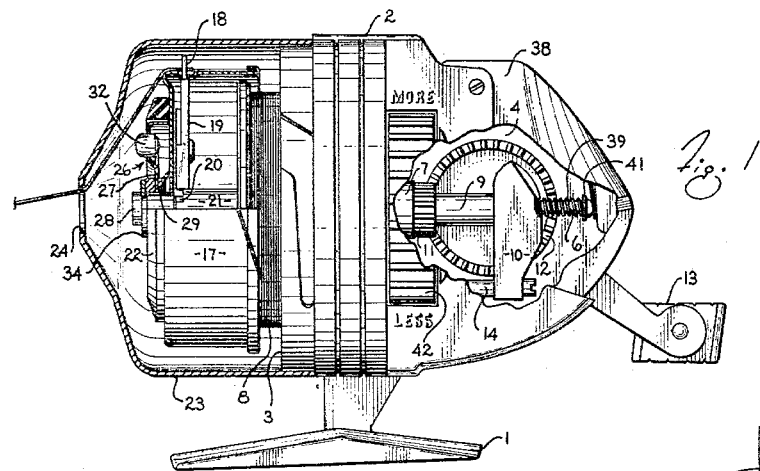
FIGURE 1 is a side, partially sectional, partially broken view of a reel of the type in question with the feathering drag of the invention applied thereto, said feathering drag being shown in its retracted, inoperative position.

In general, the invention comprises providing a spring-supported abutment normally extending through the face of a shell defining the forward end of the reel structure. Said abutment extends only a small portion of the distance between the said shell and the forward reel housing when the shell is retracted from said housing so that the line extends away from said abutment and is not inhibited thereby. As the brake lever is applied and the shell moves forward toward the housing, the space therebetween becomes restricted so that the line is then guided through a progressively narrowing zone between said shell and said housing and is thereby caused to strike against said abutment. Said abutment is sufficiently rounded and lightly enough supported that the line will pass over same without being greatly affected thereby and yet a sufficient restraint will be applied to the line to provide the feathering drag desired. As the shell makes its final approach to the housing, it applies the main brake or drag in the normal manner in which position the much lesser effect of the spring-loaded abutment may be ignored.

*Detailed description*

In the following description certain terminology will be used for illustrative purposes but will be recognized as intended for illustrative purposes only and as having no limiting significance. For example, the term "forward" will refer to that direction toward which the line discharges, namely, the leftward direction as seen in both FIGURE 1 and FIGURE 2. Conversely, the term "rearward" will indicate the direction toward the operator, namely, rightwardly as appearing in FIGURE 1 and FIGURE 2. The terms "inward" and "outward" will refer to directions toward and away from the geometric center of the apparatus.

Turning now to the drawings, there is shown a reel of the axial discharge type which, excepting for the feathering device hereinafter described, is of any of several possible standard constructions, providing only that the spool is of the nonrotating type and is movable in an axial direction toward and away from an outer line covering and guiding housing. Such reels are shown in any of several United States and foreign patents. For example, reference may be made to U.S. Patent Nos. 2,828,088 and 2,644,647.

For convenience in reference, however, a brief description of the reel herein chosen to illustrate the apparatus will now be set forth with the understanding that such particularizing of the reel structure itself is only for convenience in reference with respect to the invention and is in no sense an implication that the invention is confined thereto.

The reel is applied in a conventional manner to a fishing rod by a mounting standard 1 which supports the frame structure 2. Said frame structure has a spool cavity 3, a driving gear cavity 4 and suitable passageways for communication with each thereof. A shaft 6 is supported upon a bearing 7 and carries a sleeve 9 to the rear of said bearing with respect to which said shaft may move axially. A coil spring 39 is coaxial with the shaft 6 and is constrained to the shaft 6 between a locking ring 41 secured to the rear end of the shaft 6 and the rearward end of the sleeve 9. The spring 39 tends to maintain the shaft 6 at its axially rearmost position. The sleeve 9 supports a nonrotating slider block 10 for relative axial movement with respect thereto. Said slider block is driven reciprocably in any conventional manner, such as by a pin (not shown) which is mounted eccentrically on the inner face of the drive gear 12. Said slider block reciprocatingly drives through a rod 14 a spool 8, which lies to the left of the frame structure 2 in the spool cavity 3.

The drive gear 12 operated by a manually actuatable handle 13, drives a pinion gear 11 which is located between the bearing 7 and the sleeve 9 and in turn is concentric with, is mounted on and drives the axially slidable shaft 6. The shaft 6 may be urged axially forwardly (to the left in FIGURES 1 and 2) by pressure exerted by the operator on a pivotally mounted brake lever 38 which engages the rearward end of the shaft 6.

The spool 8 is mounted concentrically by means not shown on a fixed sleeve 21 which lies forwardly of and cooperates with the bearing 7 to suppport the shaft 6 for rotation and axial movement with respect thereto. When the line as it is being reeled in undergoes excessive tension, the spool 8 may rotate with respect to the fixed sleeve 21. The tension required to oppose such rotation is governed by a line tension adjusting mechanism which is controlled by a thumb adjusting ring 42.

Figure 2:
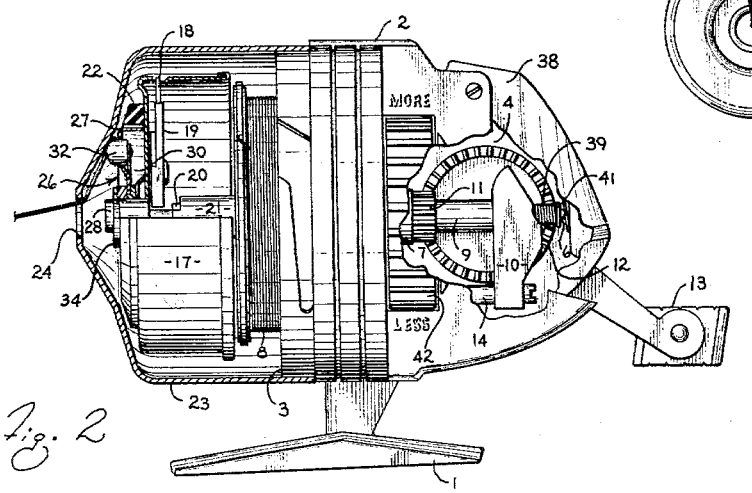
FIGURE 2 is a side view similar to FIGURE 1 and showing the feathering drag units in extended or operative position.
Figure 3:
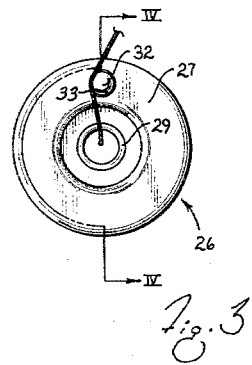
FIGURE 3 is a partial elevational view taken from the leftward end of FIGURE 2.
Figure 5:
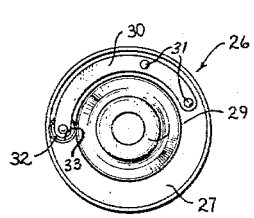
FIGURE 5 is a rear elevation of the feathering drag device.
Figure 4:
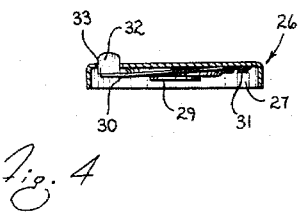
FIGURE 4 is a section taken on the line IV—IV of FIGURE 3.

Immediately forward of the spool 8 is a concentric shell 17 which is fixed to the shaft 6 for axial movement and rotation therewith. An arresting pin 18 is secured by means of a pilot mechanism 19 to the shell 17. As the shell 17 and the shaft 6 move rearwardly to approach their position as shown in FIGURE 1 the radially inward surface of the mechanism 19 rides an increasing radius ramp on the forward end of the sleeve 21 thereby pushing the arresting pin 18 to its radially outer position. A concentric brake ring 22 is fixed to the forward face of the shell 17 and engages the line against the housing 23 upon forward movement of the shaft 6 and shell 17.

All of the foregoing has been previously known and forms no part of the present invention and is here summarized, even briefly, solely to indicate the environment in which the present invention is adapted to operate. It will be recognized as illustrative only and that many details thereof may be changed without affecting the applicability of the present invention.

On the forward end of the shell 17 there is located the feathering device 26. This comprises a cup 27 encircling the post 28, which post projects forwardly from the shell 17, said cup 27 being preferably provided for this purpose with a bushing 29 suitably fixed, as by peening, rigidly with respect to said cup. A spring 30, in this case of arcuate shape, is affixed at one of its ends in any convenient manner, such as by rivets 31, to the rearward side of the cup 27 and carries at its other end an abutment 32. Said abutment projects from said spring through an opening 33 in the cup 27, the portion normally projecting beyond said cup being smoothly rounded as shown. Said cup is conveniently fastened rigidly to the post 28 by any convenient manner, such as by a snap collar 34. Spacers may be placed forwardly and rearwardly of the cup 27 on the post 28 to axially fix said cup as for example to adapt the cup 27 for use on a reel incorporating a post not designed for said cup.

*Operation*

The operation of the reel in general is the same as other reels of this general type and may be very briefly summarized. Assuming that the arresting pin 18 is in its normally retracted position, the cast may be made in the usual manner with the line feeding off the axially forward end of the spool 8. The line is snubbed and then braked by thumb pressure against the lever 38 which presses against the shaft 6 and thereby pushes the shell 17 forwardly so that the brake ring 22 presses against the inner surface of the housing 23. Release of the lever 38 permits the shaft 6 to retract from said forward position in response to action of the spring 39 and the brake is thereby released. Actuation of the handle 13 then acts through the ring gear 12 to rotate the shaft 6 which rotates the shell 17 and causes the pin extension mechanism 19 to respond to the cam 20 and become extended into its line-engaging position. Continuing rotation of the shell 17 with said pin so extended, effects a winding of line onto the spool in the usual manner. When the tension on the line during rewinding is great such as when a fish is being reeled in, said tension may be controlled by the setting of the tension adjusting ring 42.

Turning now to the operation of the improvement constituting the present invention, it will be seen that as the line is cast and is running out from the reel through the opening 24 in the housing 23 (FIGURE 1 condition), the line at first does not touch the brake ring nor the abutment 32 on its way to the opening 24 in the housing 23. Under these circumstances, the said abutment has no effect upon the travel of the line.

However, as the braking lever 38 is pressed and acts through the shaft 6 to advance the shell 17 (FIGURE 2 condition), so that the line becomes progressively more closely confined between the brake ring 22 and the housing opening 24, it is presently caused to be engaged by the abutment 32. As the shell 17 approaches very closely to the housing 23 but still before the brake ring 22 actually presses the line against said housing, the line is caused to come very close to the forwardly facing surface of the shell 17 and on each time therearound it strikes the abutment 32. Said abutment, because of the rounding of its forward surface and the lightness of the spring 30 on which it is mounted, readily retracts and only offers a slight obstruction to the line but it will be recognized that as said shell comes progressively closer to the housing 23, the line will strike said abutment at a point progressively closer to said shell and will thereby be snubbed with progressively increasing force.

This action of said abutment will not appreciably retard said line insofar as the travel of the bait is concerned, but it will restrict said line sufficiently to prevent the line itself from traveling faster than the bait and thereby prevent overrunning and snarling of the line. As the bait approaches the end of its travel, the line will be snubbed by the operator through action of the brake ring 22 against the line and the stopping thereof proceeds in the usual manner.

Although a particular preferred embodiment of the invention has been disclosed above in detail for illustrative purposes, it will be understood that variations or modifications which lie within the scope of the appended claim, are fully contemplated.

What is claimed is:

In a fishing reel assembly including a shaft, a spool mounted on the shaft and arranged to hold a line and mounted for free delivery of the line therefrom substantially axially from the spool in the casting position, a rotatable pick-up device mounted on the shaft and disposed on the forward, delivery side of the spool, said shaft projecting forwardly of said pick-up device, and means to impart relative rotation between said spool and said pick-up device, the improvement comprising: a housing having a centrally apertured front wall means positioned in front of the forward side of said pick-up device, the rearward side of the front wall means and the forward side of said pick-up device having similar, forwardly tapering and engageable surfaces, said tapering surface on said pick-up device being annular in shape and constituting a brake surface; operator-controlled means for moving said pick-up device axially toward said housing for braking engagement of said line between said tapering surfaces; a shell affixed to said shaft forwardly of but rigidly with respect to said pick-up device and having an opening therein at a point spaced from said shaft, said shell being disposed radially inwardly of said brake surface of said pick-up device; a resiliently mounted, retractable feathering device mounted within said shell and having a button normally extending forwardly through said opening and beyond said tapering surface of said pick-up device toward the path of said line between the spool and the central aperture of said housing, said button being positioned radially inwardly of said tapering surface of said pick-up device, an arcuate light leaf spring disposed within said shell substantially concentric with the axis of rotation of said pick-up device and having a radius of curvature less than the inner radius of said tapering surface on said pick-up device and spaced radially inwardly therefrom, one end of said spring being secured to said shell and said button being secured to the opposite end of said spring, said spring extending away from the point of its securement in the direction of unwinding of the line, said shell and said button being movable with said pick-up device by said operator-controlled means from a location wherein said line is entirely clear of said button at the commencement of a cast, when said pick-up device is retracted, gradually toward said rearward side of said front wall means so that the spacing between said rearward side and said button is progressively narrowed, whereby the line will be caused, momentarily during the rotation of said pick-up device, to engage said button first on the rounded forward tip thereof and later at a more rearwardly portion thereof.

References Cited by the Examiner
UNITED STATES PATENTS 3,034,741  5/62  Macy et al. _____ 242—84.2
3,085,766  4/63  Salmivuori _____ 242—84.45

MERVIN STEIN, *Primary Examiner.*
RUSSELL C. MADER, *Examiner.*